J. McGILTON.
TRACTION MEANS FOR MOTOR VEHICLE WHEELS.
APPLICATION FILED SEPT. 14, 1921.
1,412,533.
Patented Apr. 11, 1922.
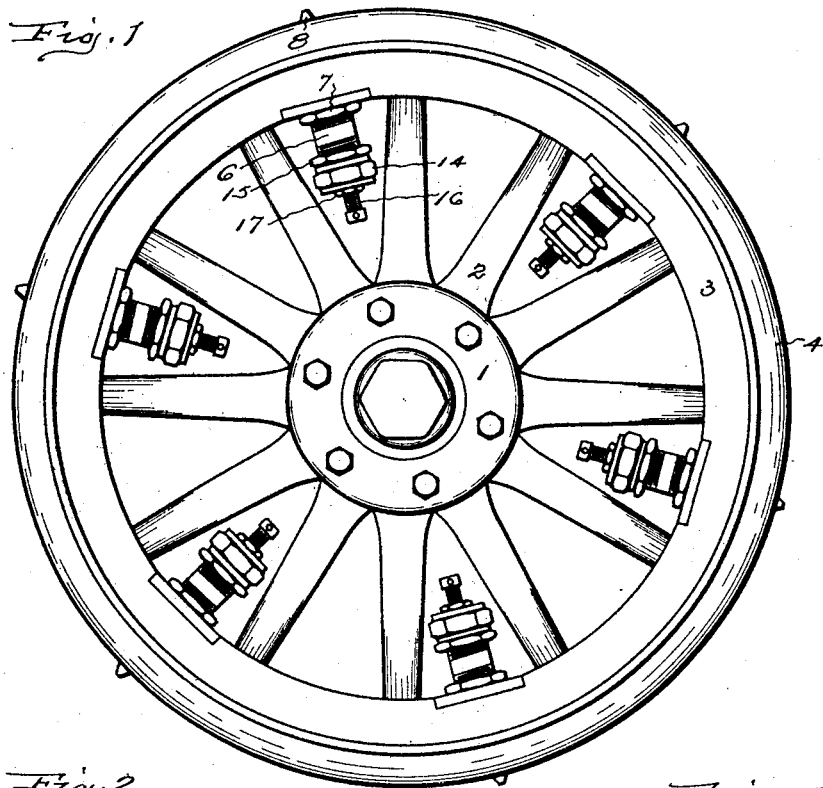
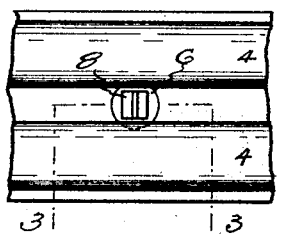
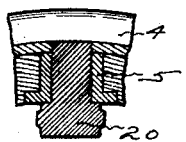
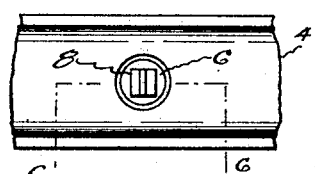
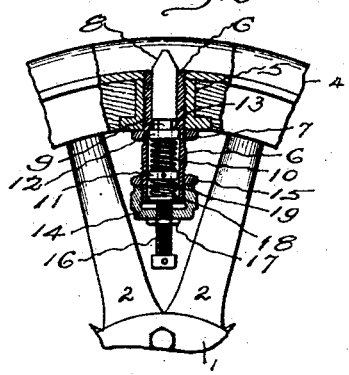
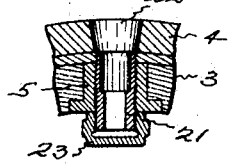
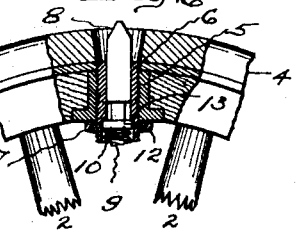
INVENTOR
James McGilton
by
Harry R. Williams
ATTORNEY

UNITED STATES PATENT OFFICE.

JAMES McGILTON, OF EAST HARTFORD, CONNECTICUT.

TRACTION MEANS FOR MOTOR-VEHICLE WHEELS.

1,412,533.     Specification of Letters Patent.    Patented Apr. 11, 1922.

Application filed September 14, 1921. Serial No. 500,596.

*To all whom it may concern:*

Be it known that I, JAMES McGILTON, a citizen of the United States, residing at East Hartford, in the county of Hartford and State of Connecticut, have invented a new and useful Improvement in Traction Means for Motor-Vehicle Wheels, of which the following is a specification.

This invention relates to means designed to be applied to the traction wheels of motor trucks and the like vehicles having single or dual solid tires for preventing slipping and increasing the traction.

The object of the invention is to provide such motor vehicle wheels with simple means which may be readily adjusted to the required degree to increase the pull of the wheels to the necessary amount to insure the driving of the loaded vehicle over ice, snow, mud, wet grass and otherwise slippery ground or pavements.

This object is attained by providing fittings adapted to be applied to the rims of the wheels between the spokes which have adjustable yielding teeth arranged in such manner that the teeth may be projected radially beyond the tires when it is desired to increase the pull of the wheels or withdrawn below the tractive surfaces of the tires, or completely removed from the rims of the wheels when it is unnecessary to employ them.

In the accompanying drawings Figure 1 shows a side view of a wheel provided with fittings which embody the invention. Fig. 2 shows a face view of a small portion of the rim of the wheel having dual tires with a traction fitting applied between them. Fig. 3 is a side elevation with a portion broken away on the dotted line 3—3 on Fig. 2. Fig. 4 shows a section of a wheel rim with the fitting removed and the fitting bushing closed by a plug. Fig. 5 is a face view of a portion of the rim of the wheel having a single tire and provided with a traction fitting which embodies the invention. Fig. 6 is a side elevation of a portion of the rim with the single tire, cut away on the dotted line 6—6 on Fig. 5. Fig. 7 shows the fitting hole in the single tire rim closed by a filling plug.

The wheel illustrated is of a common type with hub 1, spokes 2, rim 3, and solid tire 4 of usual form. On the rim there may be two tires as indicated in Fig. 2 or one tire as seen in Fig. 5.

At suitable intervals between the spokes, holes are made radially through the rim. In the case of the dual tire the holes come between the tires and in the case of the single tire the holes are continued through the tire. Fastened in these holes are metallic bushings 5 with threaded interiors. A nipple 6 is screwed into each of these bushings and a lock nut 7 is turned on the nipple against the end of the bushing to secure the nipple against displacement after it has been located. Fitted to move longitudinally in each nipple is a tooth 8 with a stem 9. The tooth shown is square and has a chisel edge, but may be any desired shape with a suitable point. On the stem is a spiral spring 10 which thrusts against a collar 11 fastened to the end of the stem and a collar 12 that is loose on the stem but is thrust by the spring against a shoulder 13 in the nipple. This spring tends to draw the tooth back into the nipple.

Screwed on the end of the nipple is a cap 14, a lock nut 15 being provided to prevent the cap from turning after it has been located. A screw 16 is threaded through the closed end of the cap and a lock nut 17 is threaded on the screw to hold it in the position to which it is adjusted. The inner end of the screw bears against a button 18 between which and the collar 11 on the end of the tooth-stem is a spiral spring 19 which forms a cushion for the tooth.

When the screw 16 is turned out of the cap, the spring 10 draws the tooth back into the rim. To increase the traction of the tire the screw 16 is turned in so as to, through the spring 19, force the tooth out the required distance beyond the periphery of the tire. With these fittings by turning the screws the teeth may be withdrawn below the surface of the tire or may be projected any required distance beyond the periphery of the tire depending upon the conditions. When in use the springs permit some yielding of the teeth so that while they will cut into ice, snow, mud and other slippery and soft material and thus increase the tractive power of the wheel they will not damage a roadway or themselves be liable to injury.

These fittings may be readily applied to common forms of solid tire truck wheels and they do not cut or wear the tires as do chains.

In seasons when it is not necessary to use these fittings the nipples may be unscrewed from the bushings, and in the case of the dual tire a plug 20 may be screwed in to protect the bushing and its threads. In the case of the single tire a metal plug 21 bearing a rubber tip 22 may be screwed into the bushing and held in place by a cap 23. Any desired number of these fittings may be arranged in the rim of a wheel and the shape of the teeth may be varied according to conditions.

The invention claimed is:—

1. The combination with the rim of a motor vehicle wheel of a bushing arranged radially in the rim, a nipple threaded into said bushing, a tooth movable longitudinally in the nipple and adapted to be projected beyond the rim, a cap screwed on the inner end of the nipple, a spring located in the nipple and adapted to draw the tooth inward, a spring located in the nipple and adapted to thrust the tooth outward, and a screw threaded through the cap and adapted to press the latter spring outward.

2. The combination with the rim of a motor vehicle wheel of a bushing arranged radially in the rim, a nipple threaded into said bushing, a tooth movable longitudinally in the nipple and adapted to be projected beyond the rim, a cap screwed on the inner end of the nipple, a spring located in the nipple and adapted to draw the tooth inward, and a screw threaded through the cap and adapted to force the tooth outward.

3. The combination with the rim of a motor vehicle wheel of a casing secured in the rim, a tooth movable longitudinally in the casing and adapted to be projected beyond the rim, a spring located in the casing and adapted to draw the tooth inward, and a screw threaded through the casing and adapted to force the tooth outward.

4. The combination with the rim of a motor vehicle wheel of a tooth arranged to be moved radially of the wheel through the rim, a spring for drawing the tooth into the rim, a spring for pressing the tooth out of the rim, and means for controlling the pressure of the latter spring.

5. A motor vehicle wheel having a rim with radial openings, teeth located in said openings, springs for drawing the teeth into the openings, and screws for forcing the teeth out of the openings against the pressure of the springs.

6. A fitting for a motor vehicle wheel comprising a casing adapted to be located in an opening through the wheel rim, a tooth movable longitudinally of the casing, a spring for drawing the tooth into the casing, and a screw for forcing the tooth out of the casing.

JAMES McGILTON.